United States Patent [19]

Harrison

[11] Patent Number: 4,710,124

[45] Date of Patent: Dec. 1, 1987

[54] AUTOMATIC PART AND RUNNER SEPARATOR

[76] Inventor: James Harrison, 13182 Marshall La., Tustin, Calif. 92680

[21] Appl. No.: 797,692

[22] Filed: Nov. 13, 1985

[51] Int. Cl.⁴ .................... B29C 45/40; B29C 45/42; B29C 45/43

[52] U.S. Cl. .................. 425/554; 249/52; 249/66 C; 249/68; 264/161; 264/334; 425/351; 425/444; 425/556; 425/DIG. 51

[58] Field of Search .............. 425/139, 236, 537, 554, 425/556, 351, 185, 436 R, 441, 444, DIG. 51; 264/336, 334, 161; 249/67, 68, 74, 76, 66 A, 66 C, 52

[56] References Cited

U.S. PATENT DOCUMENTS

| | | | |
|---|---|---|---|
| 2,363,808 | 11/1944 | Sayre | 425/556 |
| 3,508,299 | 4/1970 | Ahern | 18/30 |
| 3,572,424 | 3/1971 | Byrne | 164/347 |
| 4,050,666 | 9/1977 | Van Tichelt | 425/444 |

FOREIGN PATENT DOCUMENTS

| | | |
|---|---|---|
| 5256 | 3/1976 | Japan . |
| 16699A | 7/1976 | Japan . |
| 26233 | 6/1982 | Japan . |
| 84071880 | 8/1982 | Japan . |

OTHER PUBLICATIONS

Toshiba Machine Co., America, High Precision Injection Molding Machine, ISE 90PN, 1986.
Toshiba Machine Co., America, Super Innovation Injection Molding Machine, ISE 310, ISE 390, 1984.
Toshiba Machine Co., America, High Precision Injection Molding Machine, ISE 120N, ISE 170N, ISE 250N, 1986.
Toshiba Machine Co., America, Super Innovation Injection Molding Machine, ISE 30P, ISE 60P, 1984.

*Primary Examiner*—Jay H. Woo
*Assistant Examiner*—Timothy W. Heitbrink
*Attorney, Agent, or Firm*—Stetina and Brunda

[57] ABSTRACT

An apparatus is disclosed for selectively separating runners and molded products from an injection mold assembly. The apparatus comprises first and second mold portions having mating surfaces formed to define a runner channel and product cavity. A plurality of ejector pins are disposed within the second mold portion and adapted to translate within the second mold portion so as to retractably extend into the cavities for forming the runner and molded product. An ejector plate assembly is provided which translates the ejector pins a predetermined distance within the mold. A pin extension mechanism is connected to the ejector plate assembly and at least one ejector pin. The pin extension mechanism is adapted to selectively extend the connected ejector pin a predetermined distance beyond the stroke of the ejector plate assembly such that the connected pin is extended into contact with the channels for forming the runner, or the molded product.

14 Claims, 9 Drawing Figures

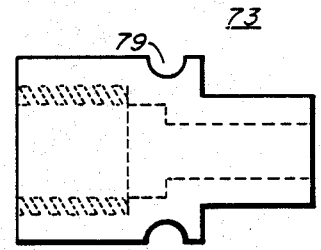
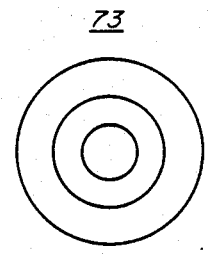
FIG. 5(a)                FIG. 5(b)
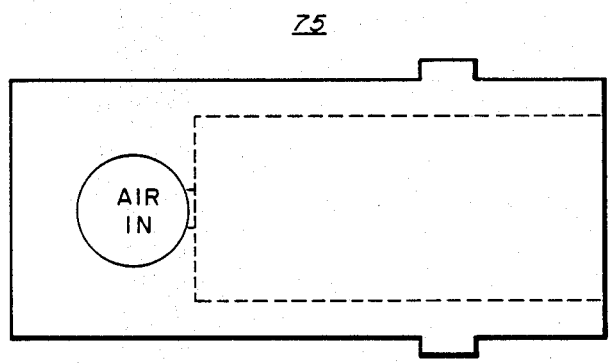
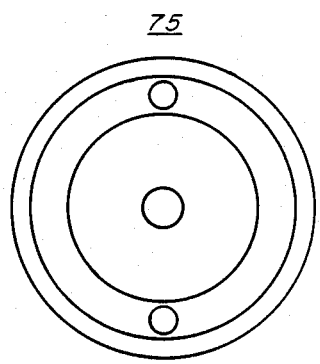
FIG. 6(a)                FIG. 6(b)

AUTOMATIC PART AND RUNNER SEPARATOR

BACKGROUND OF THE INVENTION

The present invention relates to plastic injection molds and, more particularly, to devices for separating the molded product from the mold feedline, or runner.

Various types of plastic injection molds are utilized in the industry. In general, the injection molding process includes preheating, plasticizing, and shaping of the molded product within the same tool machine. In the typical injection molding process, granules of a thermal plastic material, having high fluidity, are introduced through a hopper into a cylinder, in which they are heated, e.g., by means of a heating jacket, to above their softening point. The moving piston then plasticizes the material and forces it through a nozzle into the mold.

The molding machine typically comprises separable mold portions or platants, one being stationary, and the other being moveable. The plastic material typically enters the mold through a sprue and runner system, and then flows along the interface of the stationary and moveable mold portions. As the moveable portion of the mold retracts the molded product and the plastic feedline, known as a runner, remain attached to the surface of the moveable mold portion and retract with the moveable mold portion, thus separating the runner and molded product from the feedline to the mold port. Reciprocating ejector pins mounted in the moveable mold portion then advance toward the mold surface to separate mold product and the runner from the mold surface. Upon separation from the mold surface, the runner and molded product fall into a catch basin.

For some mold products, such as parts for model airplanes, and the like, the mold runner may remain attached to the part. However, for many mold products, it is not acceptable for the product to remain connected to the runner, or even for there to be any surface distortions resulting from the separation of the product and the runner.

Separation of the product and the runner may be effected by the utilization of certain techniques for gating the plastic into the mold. In general, a mold gate serves as a door between the runner and the part, and acts as a control valve in filling out the part. Customers for high quality, expensive plastic parts typically require that runner and gate remnants be kept within close specifications or the plastic parts will be rejected.

The most common type of gating is known as edge gating wherein the runner connects to the part normal to an end edge portion of the part. Edge gating typically results in surface distortions, requiring an operator to manually trim those distortions from the part. Other gating techniques, such as submarine gating, differ from edge gating in that the runner connects to the part away from the end of the part. Such alternative gating techniques permit the part to be automatically separated from the runner and trimmed upon separation of the mold. Hot tipped manifold gating is another technique which automatically separates a part from the runner.

Even though techniques such as submarine gating will permit the part and runner to be clearly separated upon separation of the mold, both the part and runner remain attached to the surface of the moveable mold portion until the ejector pins axially reciprocate within the moveable mold portion, causing both the part and runner to be discharged from the face of the moveable mold portion into the catch basin. Contemporary systems typically eject the part and runner at the same time onto a common catch basin or a common conveyer system. The conveyer system then carries the runner and molded parts to operators who then sort the parts and runners by hand, or operate a parts/runner separator device operatively connected to the conveyer system.

The employment of operators to manually sort runners from parts, or the utilization of various automatic sorting systems, add substantial costs to the price of producing the plastic product. Moreover, neither the manual system nor the automatic system for sorting are without error, and both may be difficult to implement with particular molds or applications. Further problems in sorting runners from parts my arise from the need to prevent contamination of plastic parts used, for example, in medical applications.

The present invention provides an apparatus and technique for sorting molded products from the mold runners within the mold itself. The invention may be incorporated into new molds, using standard mold base components, or it can be added to existing molds. The invention avoids the need for parts to be separated on parts/runners conveyer systems, therefore reducing labor costs and avoiding any need for complicated, expensive robotics, or other sorting machinery.

SUMMARY OF THE INVENTION

A method and apparatus are disclosed for selectively separating runners and molded products from an injection mold assembly. The apparatus comprises first and second mold portions having mating surfaces formed to define a runner channel and product cavity. A plurality of ejector pins are disposed within the second mold portion and adapted to translate within the second mold portion so as to retractably extend into the cavities for forming the runner and molded product. An ejector plate assembly is provided which translates the ejector pins a predetermined distance within the mold. A pin extension mechnism is connected to the ejector plate assembly and at least one ejector pin. The pin extension mechanism is adapted to selectively extend the connected ejector pin a predetermined distance beyond the stroke of the ejector plate assembly such that the connected pin is extended into contact with the channels for forming the runner, or the molded product.

The pin extension mechanism may be secured on either side of the ejector plate assembly and may be operatively controlled to be in either a normally extended or normally unextended position. The extension and retraction of the pin extension mechanism being effective to cause the connected ejector pin to contact the adjacent portion of the channel defining the runner or molded product at a different time than do ejector pins not connected to a pin extension mechanism.

In the presently preferred embodiment, the pin extension mechanism comprises a piston assembly that is moveable in response to the application of a source of pressurized air. The pin extension mechanism may be energized independent of the movement of the ejector plate assembly, such that the connected pin is extended only during certain strokes of the ejector plate assembly, or portions of such strokes.

BRIEF DESCRIPTION OF THE DRAWINGS

FIGS. 4, 5 and 6 illustrate components of the ejector pin reciprocating apparatus illustrated at FIG. 3.

DETAILED DESCRIPTION OF THE PREFERRED EMBODIMENT

The description set forth below in connection with the appended drawings is intended merely as a description of the presently preferred embodiment of the invention, and is not intended to represent the only form in which the present invention may be utilized. The description sets forth the functions and sequence of events that are affected by the invention in connection with the illustrated embodiment. It is to be understood, however, that the same, or equivalent functions and sequences, may be accomplished by different embodiments that are also intended to be emcompassed within the spirit and scope of the invention.

Figure 1:
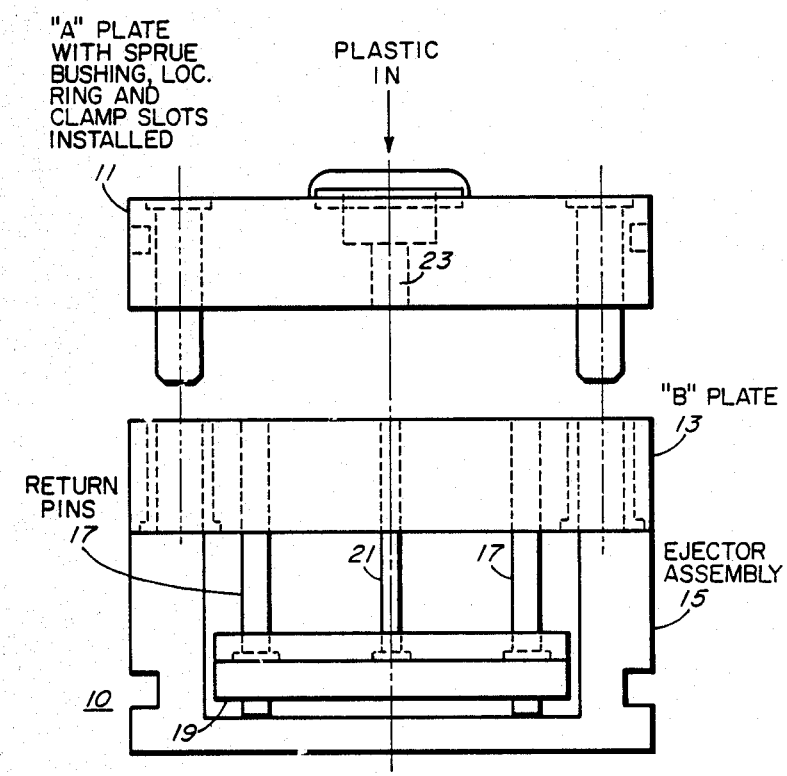
FIG. 1 is a cross-sectional view of a typical mold assembly.

Referring to FIG. 1, a contemporary injection mold assembly 10 is illustrated therein. Assembly 10 includes platants 11 and 13 adapted for mateable engagement with each other. Platant 13 is secured to ejector assembly 15 and, with ejector assembly 15, collectively form the base of the mold assembly. Return pins 17 facilitate movement of ejector plate 19 within ejector assembly 15. Ejector pin 21 is representative of numerous ejector pins that may be fixedly secured to ejector plate 19, and adapted to extend through or near the upper surface of platant 13 upon reciprocation of ejector plate 19. As shown at FIG. 1, ejector pin 21 is adapted to eject the plastic material entering plate 11 and through sprue 23 from the surface of platant 13 directly above ejector pin 21. The use of additional ejector pins, as well as the mold path to form the plastic product, is illustrated in more detail in connection with FIG. 2.

Figure 2:
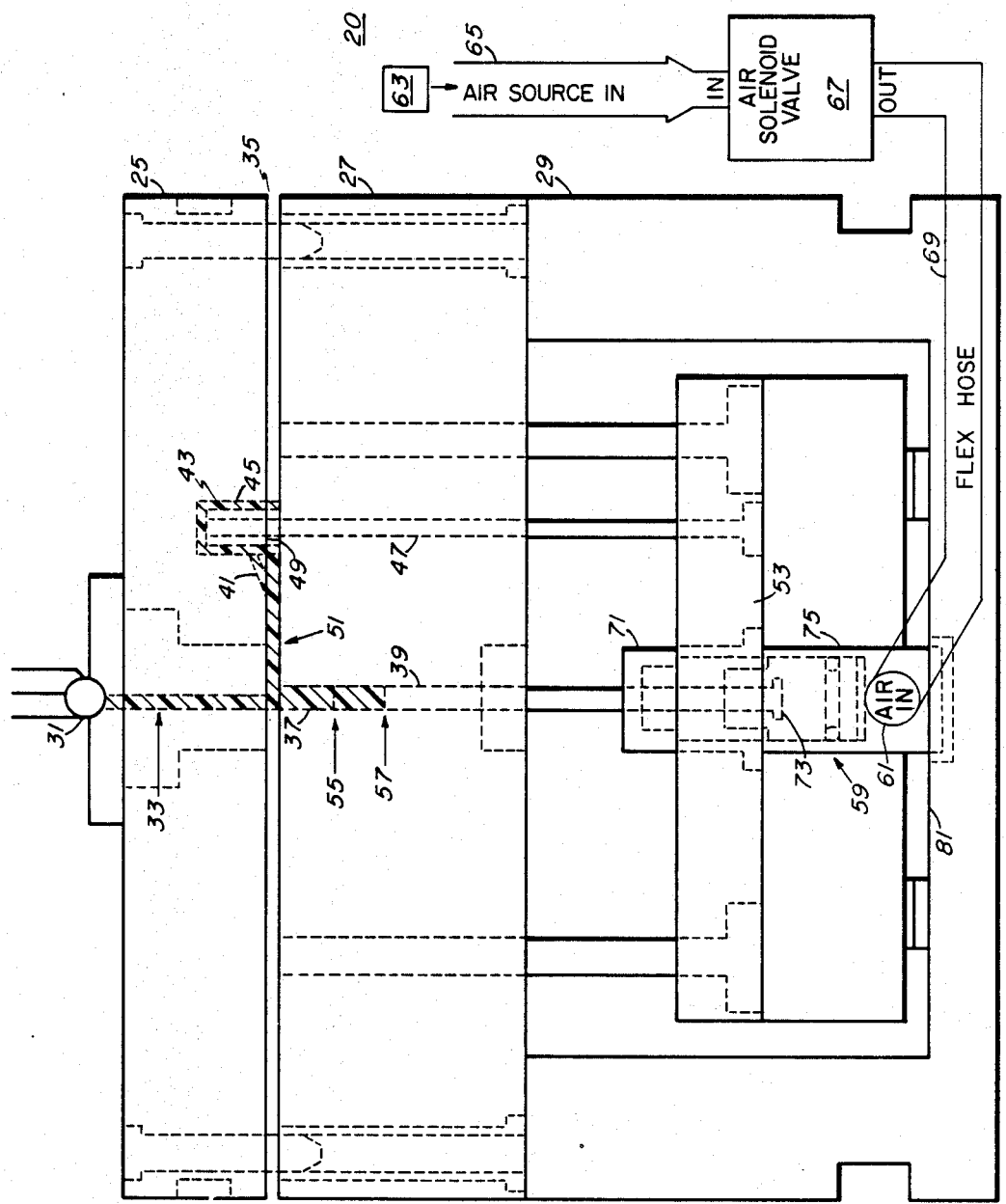
FIG. 2 is a cross-sectional view of a mold assembly incorporating the features of the present invention.

Referring now to FIG. 2, a similar mold assembly is shown therein with the ejector assembly being modified to incorporate the features of the present invention. Mold assembly 20 includes platants 25 and 27, and ejector assembly 29. The mold assembly may incorporate various types of commercially available platants and mold bases such as those produced by D-M-E Corporation, a subsidiary of VSI Corporation of Pasadena, Calif., or Precision Mold Base Corporation of Fullerton, Calif.

Plastics enters mold assembly 20 through port 31 in the upper surface of platant 25. The plastic flows through sprue 33 until it reaches the interface 35 between platants 25 and 27, which defines a runner channel and a cavity shaped to form the desired product. A portion of the plastic flows into cavity 37, beneath sprue 33, which provides a path for reciprocation of ejector pin 39 within platant 27. The plastic also flows along interface 35 through gate 41 into recess or cavity 43 designed to permit the plastic to form the desired shape of product 45.

As indicated above, it should be understood that though gate 41 is illustrated as a submarine gate, it may be formed as other types of gates within the scope of the invention. It is also to be understood that although the single cavity 43 is shown to produce product 45, the mold may include a plurality of cavities designed to facilitate the formation of multiple products during each molding cycle.

FIG. 2 also shows a second ejector pin 47 disposed so as to axially reciprocate within platant 27 and to eject the product 45 from the surface of platant 27.

After the plastic is injected into the mold assembly 20 to form the product 45, platant 27 is moved with respect to platant 25. Typically, platant 25 remains stationary, and platant 27 is retracted, though the opposite may take place. As a consequence of the relative movement between platants 25 and 27, the plastic material is sheered from port 31 and remains attached to the upper surface of platant 27. Such attachment is facilitated by the attachment of the plastic about core 49, which is attached to platant 27 to form the inner definition of cavity 45. The plastic attachment to platant 27 is also facilitated by the flow of plastic into cavities, such as cavity 37, which form a passagement for reciprocation of the ejector pins.

Thus, with the use of submarine gating, as shown at gate 41 in FIG. 2, retraction of platant 27 from platant 25 serves to sever the product 45 from runner 51. However, both product 45 and runner 51 remain secured to the upper surface of platant 27, as platant 27 is retracted.

As platant 27 withdraws from platant 25, ejector plate 53 moves toward platant 25, such that ejector pins 39 and 47 would, in contemporaneous devices, normally simultaneously contact the plastic forming the runner 51, and product 45 respectively, causing runner 51 and product 45 to separate from the surface of platant 27 and fall into a catch basin, or conveyer belt, or the like. In order to cause separation of the runner 51 and product 45, the ejector pins must typically travel to the upper surface of platant 27, or the upper surface of port 49 in order to separate the plastic material from the contact surface. The present invention resides in apparatus and a technique for sequencing the impact of the ejector pins against the molded plastic portions, e.g., the runner and molded product so as to sequence the separation of product 45 and runner 51 from the surface of platant 27. Thus, in view of the continued separation of platants 25 and 27, both product 45 and runner 51 will not fall into the same collector, and therefore need not be sorted using conventional sorting techniques.

In accordance with the present invention, ejector pin 47 is caused to separate product 45 from the surface of platant 27 before ejector pin 39 causes runner 51 to separate from the surface of platant 27. Because the platant 27 continues to move with respect to platant 25 after product 45 has been ejected, the runner 51 is ejected at a distance further from platant 25, and therefore may be directed into a separate catch basin or conveyer belt. Though it is anticipated that various apparatus and techniques may be used to separate the product 45 from platant 27 at a different time and/or location as platant 27 continues to separate from platant 25, the description set forth below details one embodiment for effecting such separation.

In modifying many conventional mold assemblies to accommodate the present invention, such modifications would typically include shortening the length of at least one of the ejector pins so that the normal stroke of the ejector pin as a result of movement of the ejector plate will not be sufficient to separate the adjacent plastic portion from the mold, whereas the stroke of the unshortened ejection pin will be sufficient to eject the plastic portion adjacent the unshortened pin. Later, e.g., on a second or later stroke of the ejector plate 53, the shortened pin is caused to extend from the ejector plate 53 a sufficient distance such that the plastic portion adjacent the shortened pin is also forced to separate from the surface of platant 27. Because the platant 27 has moved in between the first and second strokes of ejector assembly 53, the later rejected plastic portion can readily be directed to a separate catch basin or conveyer belt.

In the presently preferred embodiment, ejector pin 39 is shortened such that instead of extending to position 55, when ejector assembly 53 is in its lower position, ejector pin 39 only extends to location 57 at that same time. Consequently, the stroke of ejector assembly 53 is sufficient to cause product 45 to separate from the upper surface of core 49, as a consequence of the translation of ejector pin 47.

In order to cause ejector pin 39 to travel an additional distance beyond the stroke of ejector plate 55, i.e., sufficient to separate runner 51 from platant 27, ejector plate 55 is provided with ejector pin reciprocating apparatus 59. Reciprocating apparatus 59 may be disposed on either side of ejector plate 55. Reciprocating apparatus 59 may be formed as a piston assembly operative to extend ejection pin 35 toward the upper surface of platant 27 on the receipt of pressurized air through port 61. When compressed air is not received through port 61, the ejection pin 39 will not extend beyond the stroke of ejector plate 55, and thus will not push the plastic in cavity 37 sufficiently far to separate the sprue and runner from the surface of platant 27.

The reciprocating apparatus 59 receives compressed air from an external air source 63 through conduit 65, air solenoid valve 67, and flexible hose 69. The air solenoid valve 67 may be any of a variety of air solenoids adapted to gate pressure from pressurized air source 63 in response to control signals indicative of parameters such as the stroke of ejector plate 53 and the separation of the platants 25 and 27. In practice, such control signals may be generated by the molding machinery which controls the injection of plastic into the mold, separation of the platants, and reciprocation of the ejector plate. The control signals may be responsive to the implementation of one or more of those control functions. Such molding machines include injection molding machines manufactured by various companies, including Toshiba of Japan. More detail of the structure and operation of the ejector pin reciprocating apparatus 59 is disclosed in connection with FIGS. 3, 4 and 5.

Figure 3:
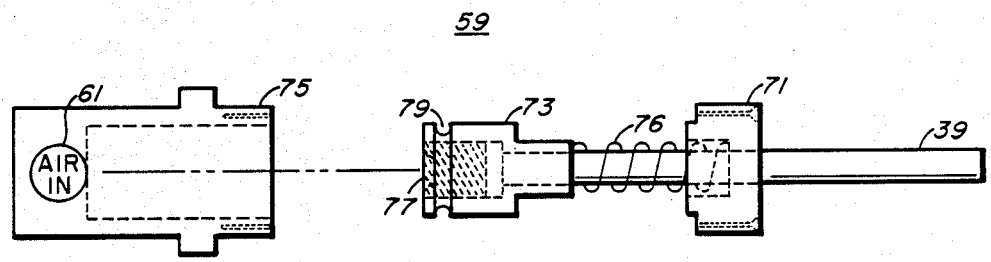
FIG. 3 is an exploded view of an ejector pin reciprocating apparatus in accordance with the present invention.
Figure 4A:
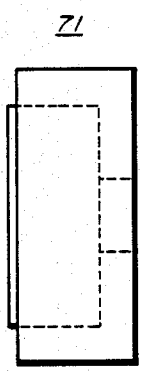
Figure 4B:
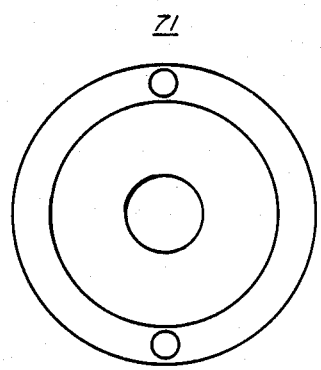

FIG. 3 illustrates the construction of an exemplary ejector pin reciprocating apparatus 59. The reciprocating apparatus 59 includes ejector pin 39, cap 71, piston 73, spring 76 and housing body 75. Ejector pin 39 extends through cap 71 and is secured within piston 73. Set screw 77 may be provided at the opposite end of piston 73, and may be adjusted to vary the extension of pin 39 into the platant 27. Alternatively, pin 39 and piston 73 may be formed as an integral structural member, which may eliminate the need for a separate set screw 77.

Cap 71 may be secured to ejector plate 53, such that spring 76 biases the ejector pin 39 away from the upper surface of platant 27. On the application of air pressure to the surface of piston 73, the pin 39 may be further extended until piston 73 is seated within cap 71.

Housing body 75 is constructed to receive piston 73 and allow piston 73 to axially reciprocate within the body 75. Air inlet 61 is in communication with air solenoid valve 67, such that pressure is applied to move piston 73 at the correct time.

Referring to FIGS. 3, 4, 5 and 6, the construction of the invention may be as follows. The ejector pin 39, or a sprue puller pin, may slide into the piston and be held in place into the piston 73, and be held in place within piston 73 by set screw 77. As previously indicated, the set screw 77 may further be adapted to vary the extension of pin 39. An "O" ring groove 79 may be provided about the piston to separate the pressurized interior of body 75 from the cavity in which ejection pin 39 travels. The surface of an "O" ring fitting within groove 79 and the external surface of the piston may be provided with a light coat of grease or oil to facilitate motion of the piston within body 75. After the piston 73 is placed within body 75, the spring 76 is placed about the ejector pin against the piston. The cap 71 then slides over the ejector pin and is secured to ejector plate 53. The sizing the body 75, piston 73, and cap 71 will of course depend upon the particular mold with which they are used, and the operating characteristics of the individual mold, e.g., size of the ejector body, length of the stroke of the ejector plate, and the length of stroke of the platent 27 from platant 25. If necessary, nd perture may be formed in body 81 to facilitate extension of housing body 75.

In operation, as the mold is opened, part of its separating distance between platants 25 and 27, ejector plate 53 is reciprocated one or more times to discharge part 45 from the surface of platant 27. As the mold continues to open, the ejector plate again reciprocates and air is simultaneously delivered through the solenoid valve 67 to body 75, causing piston 73 to thrust towards the surface of platant 27 in an amount needed to release the runner 51 from the mold. The runner then falls into a sorting area separate from that in which the part 45 has fallen.

As is indicated above, various modifications are anticipated within the scope of the present invention. In one such variation, the pin engaged with reciprocating apparatus 75 may be caused to eject the adjacent plastic portion prior to ejection caused by the non-reciprocating ejection pin, i.e. the pin not connected to reciprocating apparatus 59. Thus, as applied to the embodiment illustrated at FIG. 2, the runner 51 may be caused to separate from the mold prior to separation of product 45.

Additionally, the function of reciprocating apparatus 59 may be affected by the motion of ejector plate 53, where ejector plate 53 cycles through two different length strokes, and the ejector pins are different lengths, i.e., the upper surface of the pins are disposed at different distances from the surface of platant 27. Thus, the first stroke may be sufficient to separate one of the parts, or runner, and the second stroke will cause separation of the remaining one. Such a modification is likely to have more application with new molds, because modification of the stroke of the ejector plate in existing molds may not be commercially feasible.

Additional modifications and improvements of the invention may also be apparent to those skilled in the art in view of the particular product to be molded, and the structure and operation of the particular mold with which the invention is utilized. Thus, the particular combination of parts described and illustrated herein are intended to represent only one embodiment of the invention, and are not intended to serve as limitations of alternative devices within the spirit and scope of the invention.

What is claimed is:

1. A runner and product separator for sequentially separating a runner and a molded product from an injection mold assembly comprising:
   first and second mold portions disposed in retractable mutual engagement, said first and second mold portions having mating surfaces formed to mold a runner and a product therebetween;
   an ejector plate assembly disposed within said second mold portion, said ejector plate assembly being operative to retractably translate a first distance within said second mold portion;
   a plurality of first ejector pins connected to said ejector plate assembly so as to translate within said second mold portion to strike, and separate from said second mold portion, only one of said runner and said product; and
   a pin extension mechanism disposed within said second mold portion and connected to a second ejector pin, said pin extension mechanism being adapted to retractably translate said second ejector pin independent of the translation of said ejector plate assembly to cause said second ejector pin to strike and separate from said second mold portion the other of said runner and said molded product.

2. The apparatus as recited in claim 1 wherein said pin extension mechanism is operative to translate said second ejector pin said second distance after said ejector plate assembly has translated said first distance.

3. The assembly as recited in claim 1 wherein said first eject pins are translatable to strike said product and separate said product from said second mold portion.

4. The apparatus as recited in claim 1 wherein said second ejector pin is translatable to strike said runner and separate said runner from said second mold portion.

5. The apparatus as recited in claim 1 further comprising means for sequencing the translation of said first and second ejector pins to separately eject said part and said runner from said second mold portion.

6. The apparatus as recited in claim 1 further comprising means for sequencing the translation of said first and second ejector pins such that said part and said runner are separated from said second mold portion at different times.

7. The apparatus as recited in claim 1 wherein said pin extension mechanism is rigidly secured to said ejector plate and assembly.

8. The apparatus as recited in claim 7 wherein said second ejector pin translates said first distance with the translation of said ejector plate assembly so as to strike said runner without separating said runner from said second mold portion.

9. The apparatus as recited in claim 1 wherein said first ejector pins are rigidly secured to said ejector plate.

10. The apparatus as recited in claim 1 wherein said pin extension mechanism comprises ejector pin reciprocating apparatus.

11. The apparatus as recited in claim 10 wherein said ejector pin reciprocating apparatus comprises an ejector pin reciprocating apparatus housing, a piston secured to said first ejector pins and adapted to reciprocate within said housing, and a pressure port formed in said housing, said pressure port being in fluid communication with the source of pressurized air, such that said pressurized air causes said piston to translate within said body towards said first mold portion.

12. The apparatus as recited in claim 11 further comprising an air solenoid valve connected to said pressure port and said pressure source to selectively communicate said pressure source to said housing in response to control signals.

13. The apparatus as recited in claim 12 wherein said control signals are responsive to separation of said first and second mold portions.

14. The apparatus as recited in claim 13 wherein said control signals are responsive to translation of said ejector plate assembly.

* * * * *